US012046819B2

(12) United States Patent
Tamrakar et al.

(10) Patent No.: US 12,046,819 B2
(45) Date of Patent: Jul. 23, 2024

(54) INTEGRATED COMBO SLOT ANTENNAS IN FULL METAL CHASSIS AND ISOLATION IMPROVEMENT TECHNIQUE

(71) Applicant: Intel Corporation, Santa Clara, CA (US)

(72) Inventors: Maruti Tamrakar, Chennai (IN); Sagar Gupta, Ghaziabad (IN); Jayprakash Thakur, Bangalore (IN); Prasanna Pichumani, Bangalore (IN)

(73) Assignee: Intel Corporation, Santa Clara, CA (US)

(*) Notice: Subject to any disclaimer, the term of this patent is extended or adjusted under 35 U.S.C. 154(b) by 350 days.

(21) Appl. No.: 17/448,724

(22) Filed: Sep. 24, 2021

(65) Prior Publication Data

US 2022/0200165 A1 Jun. 23, 2022

(30) Foreign Application Priority Data

Dec. 18, 2020 (EP) .................................... 20215444

(51) Int. Cl.

| | |
|---|---|
| ***H01Q 1/22*** | (2006.01) |
| ***H01Q 1/38*** | (2006.01) |
| ***H01Q 13/10*** | (2006.01) |
| ***H01Q 21/06*** | (2006.01) |

(52) U.S. Cl.

CPC ............. *H01Q 21/064* (2013.01); *H01Q 1/38* (2013.01); *H01Q 13/106* (2013.01)

(58) Field of Classification Search

CPC ...... H01Q 21/064; H01Q 1/38; H01Q 13/106; H01Q 1/521; H01Q 13/16; H01Q 21/28; H01Q 1/2266; H01Q 13/10; H01Q 1/242; H01Q 1/52; G06F 1/1658; G06F 1/1698

See application file for complete search history.

(56) References Cited

U.S. PATENT DOCUMENTS

| | | | | |
|---|---|---|---|---|
| 8,552,913 | B2 | 10/2013 | Ayatollahi et al. | |
| 2004/0051670 | A1 | 3/2004 | Sato | |
| 2010/0238079 | A1* | 9/2010 | Ayatollahi ............. | H01Q 1/521 343/729 |
| 2020/0136261 | A1* | 4/2020 | Jain ........................ | H01Q 1/521 |
| 2020/0136268 | A1 | 4/2020 | Saeidi et al. | |

FOREIGN PATENT DOCUMENTS

| | | | |
|---|---|---|---|
| WO | WO-2018219070 A1 * | 12/2018 | ............... H01Q 1/36 |

* cited by examiner

*Primary Examiner* — David E Lotter
(74) *Attorney, Agent, or Firm* — 2SPL Patent Attorneys PartG mbB; Kieran O'Leary

(57) ABSTRACT

A slot antenna assembly for a portable electronic device is disclosed. The assembly includes a first slot antenna having a first slot through a substrate from an outer surface of the substrate to an inner surface of the substrate. The assembly also includes a second slot antenna including a second slot through the substrate from the outer surface of the substrate to the inner surface of the substrate. An isolator includes at least one of an isolation slot and a conductor. The isolation slot includes a substrate isolation slot which extends through the substrate between the first and second slot antennas; and a conductor. The conductor connects the inner surface of the substrate between the first and second antennas to an opposite inner surface of an opposite substrate opposite the inner surface between the first and second antennas.

24 Claims, 7 Drawing Sheets

INTEGRATED COMBO SLOT ANTENNAS IN FULL METAL CHASSIS AND ISOLATION IMPROVEMENT TECHNIQUE

CROSS-REFERENCE TO RELATED APPLICATIONS

This application claims priority to European Application 20215444.9, filed on Dec. 18, 2020. The content of this earlier filed application is incorporated by reference herein in its entirety.

FIELD

Examples relate to antennas and antenna systems for portable electronic devices, such as laptops and tablets.

BACKGROUND

Examples relate to portable electronic devices which may include multiple antennas for enabling wireless communication. Small portable devices with multiple antennas can present multiple design challenges.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
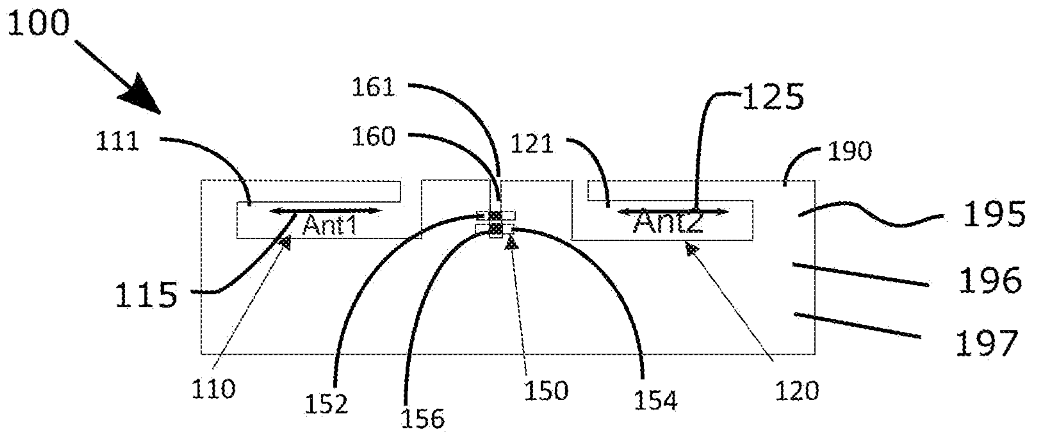
FIG. 1 illustrates a slot antenna assembly.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e., only A, only B, as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Herein a feature, which is described as being "comparable" to another feature described herein, expressly may include the sub-features and optional features described in relation to the other feature. For example, if a first slot antenna is described as having a long axis, and a second slot antenna is described as being comparable to the first, then the second slot antenna can have a long axis as well.

Herein, "Ghz" is used for gigahertz. Herein, "MIMO" is used for multiple-input and multiple-output.

Herein "isolation" may be considered to be a reduction in electromagnetic coupling between nearby antennas; for example, an isolator may reduce multipolar electric and/or magnetic coupling between nearby (such as adjacent) antennas.

Herein a slot may be a line-shaped through-hole in a substrate. A slot may have a long axis and a short axis, each in the substrate, such as in a plane of the substrate. Herein, a slot may have more than one slot portions, such as an L-shaped slot which may include two slot portions. A T-shaped slot may also include two slot portions. L and T shaped slots, such as for antennas, may include planar portions; for example a leg of the slot may extend perpendicularly from a planar slot portion shaped like a line, the leg continuing to an edge of the substrate; the leg of the slot may meet another portion of the slot from which the slot may continue, and may possibly extend out of the plane of the planar portion of the slot (e.g., perpendicular to the plane); the slot may include portions from adjoining substrates, e. g. "another portion" of the slot may extend to an adjoining substrate.

Herein a substrate may be at least partially planar; for example, the plane of a substrate as referred to herein may be a portion of a substrate which is planar. A substrate may be at least part of a metal chassis, for example of a PED. Herein, the planar portion of a substrate may include at least one antenna slot thereof.

Herein, slots may have a window, e.g., a nonconductive and/or plastic window. For example, slots may have windows that are flush with the outer surface of the substrate. A window material for the slot may be a plastic filling, and/or may be formed by thermal bonding and/or molding.

Herein, substrates in which slot antennas are formed may be conductive substrates, such metal substrates, such as aluminum substrates.

Herein, the "conductor" described herein, particularly as part of the isolator, may be referred to as a short or shorting.

FIG. 1 illustrates a slot antenna assembly 100 for a portable electronic device (PED). The slot antenna assembly 100 includes a first slot antenna 110 which includes a first slot 111; and a second slot antenna 120 which includes a second slot 121. The first and second slots 111, 121 can go through the substrate 190, from the outer surface 196 of the substrate to the inner surface 197 of the substrate 190. The assembly includes an isolator 150. The isolator 150 can be at least one of: an isolation slot 160 and a conductor. FIG. 1 shows an isolation slot 160. The isolation slot 160 can include a substrate isolation slot 161, which is between the first and second slot antennas 110, 120, as shown. The substrate isolation slot 161 can go through the substrate 190 from the outer surface 196 to the inner surface 197. The isolator and/or isolation slot can reduce coupling between the antennas. The substrate 190 can be a chassis and/or conductive substrate such as a metal such as aluminum; aluminum may be desirable for being light and corrosion resistant.

The isolator 150 can include at least one of a capacitor 152, a resistor 154 (such as an RC circuit in parallel), and an inductor 156. An RC and/or RLC circuit (resistance-capacitance and/or resistance inductance capacitance) can reduce coupling between adjacent antennas, particularly over a possibly adjustable band of frequency, where isolation may be particularly desired (e.g., at a data transmission frequency).

At least part of the isolator 150 can be located between the first and second slot antennas 110, 120, such as between the long axes of the first and second antennas 110, 120. The first slot 111 can include a first slot long axis 115. The second slot can have a second slot long axis 125, which is aligned with the first slot long axis 115, e.g., in the plane 195 of the substrate 190. In FIG. 1, the long axes 115, 125 of the slots 111, 121 of the slot antennas 110, 120 extend horizontally. The substrate isolation slot 160 can be between the first slot long axis 115 and the second slot long axis 125. Having a slot between the long axes can be particularly effective at reducing coupling between the antennas.

Figure 2A:
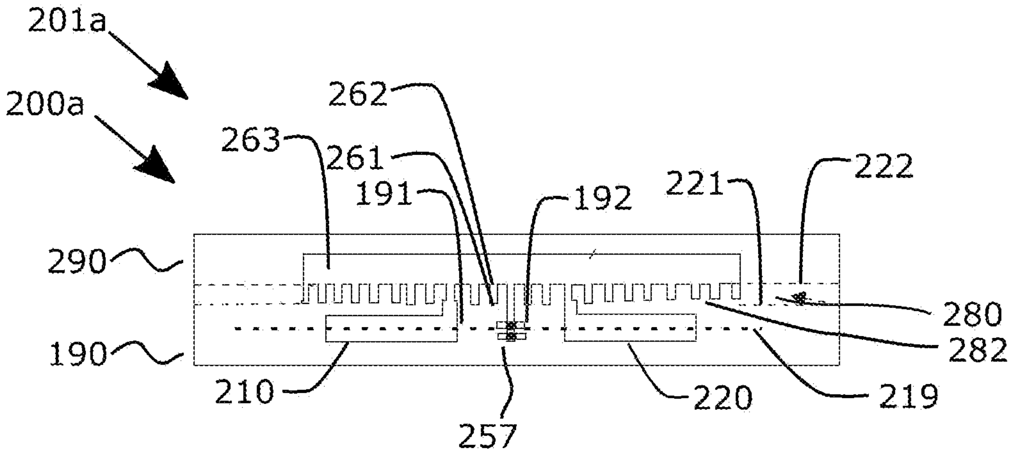
FIG. 2*a* depicts a portable electronic device assembly.

FIG. 2*a* depicts a portable electronic device assembly 201*a* including a slot antenna assembly 200*a* for a portable electronic device (PED). The view shown in FIG. 2*a* may be understood to depict the PED assembly 201*a* flattened out to better illustrate features and relationships therebetween. When the edges 221, 222 are folded at 90°, the substrate 190 and an opposite substrate 290 are opposite each other. In FIG. 2*a*, dotted lines indicate edges 221, 222 of an edge portion 280 of the PED assembly 201*a*. The edge portion 280 may connect the substrate 190 and the opposite substrate 290.

Figure 2B:
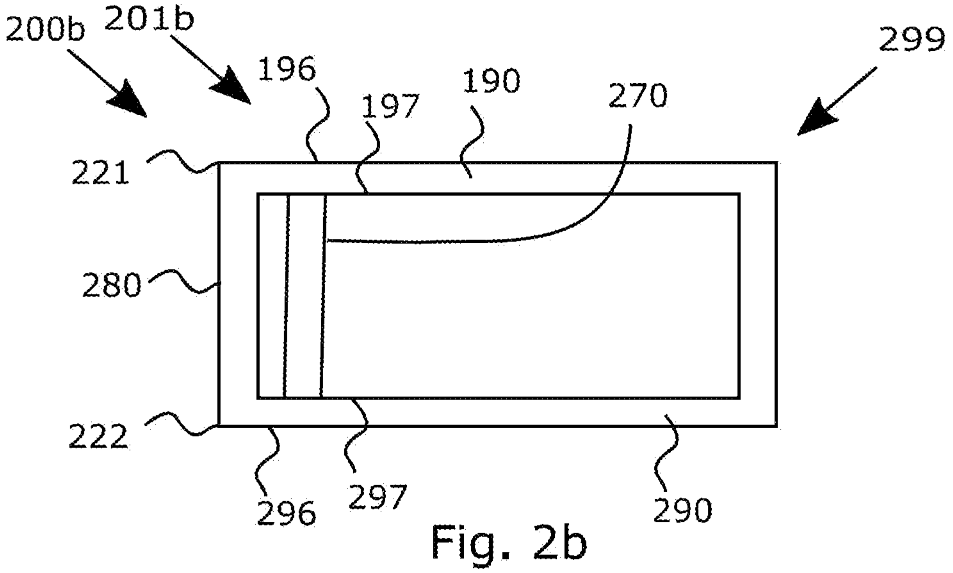
FIG. 2*b* depicts a cross-sectional view of a portable electronic device (PED) assembly.

FIG. 2*b* depicts a cross-sectional view of a PED assembly 201*b* including a slot antenna assembly 200*b* for a portable electronic device. FIG. 2*b* shows an edge portion 280 of the antenna assembly 200*b*, the substrate 190, and the opposite substrate 290. The substrate 190 and opposite substrate 290 each have inner surfaces 197, 297 which are opposite each other. The substrate 190 and opposite substrate 290 each have outer surfaces 196, 296, respectively. The outer surfaces 196, 296 may together be at least part of the outer surface 299 of the antenna assembly 200*b* and/or PED assembly 201*b*.

The isolator 150 can include a conductor 270 which connects the inner surface 197 of the substrate 190 to the opposite inner surface 297 of the opposite substrate 290. This can reduce coupling between the antennas 110, 120 particularly in the geometry explained with regard to FIGS. 2*b* and 3. The conductor 270 may connect the inner surface 197 between the first and second slot antennas 210, 220 to an opposite inner surface 297 of an opposite substrate 290 which is opposite the inner surface 197 between the first and second antennas 110, 120.

The substrate 190 may have first and second portions 191, 192 which are between the substrate isolation slot 161 and the antennas 110, 120. For example, the first portion 191 is between the substrate isolation slot 161 and the first slot 111, and the second portion 192 is between the substrate isolation slot 161 and the second slot 121. The conductor 270 may connect first and second portions 191, 192 of the substrate from the inner surface 197 of the substrate 190 to the opposite inner surface 297 of the opposite substrate 290 (see FIGS. 2*b* and 3 also). The conductor 270 may, for example, increase the bandwidth of the improved isolation performance. Alternatively/additionally, the conductor 270 may improve overall antenna efficiency (e.g., the efficiency of at least one antenna).

FIG. 2*a* shows an imaginary line 219 which is along the first and second long slot axes 115, 125 shown in FIG. 1. The imaginary line 219 can go through the centers of the slots. The first slot 111 can have a first long slot axis 115 in a plane 195 of the substrate 190, and the second slot 121 can have a second long slot axis 125 in a plane of the substrate 190. As illustrated in FIG. 2*a*, at least part of the substrate isolation slot 161 can intersect the imaginary line 219. When at least part of the isolation slot 160 is between the antenna long axes 115, 125, as shown in FIG. 2*a*, more effective isolation of antenna coupling may be possible. Alternatively/additionally, when the first and second portions 191, 192 of the substrate 190 are along the imaginary line 219, and the first and second portions 191, 192 are connected by the conductor 270 from the inner surface 197 of the substrate 190 to the opposite inner surface 297 of the opposite substrate 290 (see FIGS. 2*b* and 3 also), there can be more effective isolation of antenna coupling.

FIG. 2*a* shows the substrate 190 and the opposite substrate 290. The substrate 190 may be a C-cover for a laptop, e.g., the part of the laptop cover frame and/or chassis around the keyboard. The C-cover may include the antenna 210, 220. The opposite substrate 290 can be a D-cover for a laptop, e.g., the part of a laptop cover and/or chassis opposite the plane of the keyboard. The C-cover and D-cover may connect, for example, at the edge portion 280, at the substrate 190, and/or at the opposite substrate 290.

The slot antenna assemblies described herein may be used in a PED, which may include a cover (such as a C-cover) that includes the substrate 190, the first and second slots 111, 121 of the antennas. An A-cover for a tablet may include a slot assembly as described herein, the A-cover including the substrate 190, and a display frame which may include the opposite substrate 290.

The edge portion 280 may include cut-outs 282 for use as thermal vents. Referring also to FIG. 1, and referring also to the edges 221, 222 folded at 90° (shown as dotted lines in FIG. 2*a*), the inner surface 197 of the substrate 190 can be opposite to an opposite inner surface of the opposite substrate 290.

As illustrated in FIG. 2*a*, the first portion 191 of the substrate 190 may be between the substrate isolation slot 261 and the first antenna 210. The second portion 192 of the substrate 190 may be between the substrate isolation slot 261 and second antenna 220.

FIG. 2*a* also illustrates an optional RC and/or LRC circuit 257. The capacitor and the resistor, and optionally the inductor, can each electrically connect the substrate 190 at the first portion 191 of the substrate 190 which is at a first side of the substrate isolation slot 261 by the first slot antenna 110 to the second portion 192 of the substrate 190 on a second side of the substrate isolation slot 261 by the second slot antenna (120). The capacitor, resistor, and/or inductor of the RC and/or LRC circuit 257 can span across the substrate isolation slot 261.

As illustrated in FIGS. 1, 2*a*, and 2*b*, at least part of the isolator 150, such as the substrate isolation slot 261 and/or LRC circuit, can be located between the first and second slot antennas 110, 120. Alternatively/additionally, a conductor 270, as illustrated in FIG. 2*b*, can be located between the first and second slot antennas 110, 120.

The isolator 150 can include the conductor 270. As seen in FIG. 2*b*, the conductor 270 can connect the inner surface 197 of the substrate 190, between the first and second antennas 110, 120, to an opposite inner surface 297 of an opposite substrate 290 which is opposite to the inner surface 197 between the first and second antennas 110, 120. For example, the conductor 270 connects the first portion 191 of the substrate 190 to the opposite inner surface 297. Alternatively/additionally, the conductor 270 connects the second portion 192 of the substrate 190 to the opposite inner surface 297.

FIG. 2*a* shows an opposite slot 263 which is in the opposite substrate 290. The opposite slot 263 may connect to the first slot 111, second slot 121, and/or an edge isolation slot 262. As depicted in FIG. 2*a*, the opposite slot 263 may be regarded as an opposite antenna slot which is opposite the first antenna slot.

Figure 3:
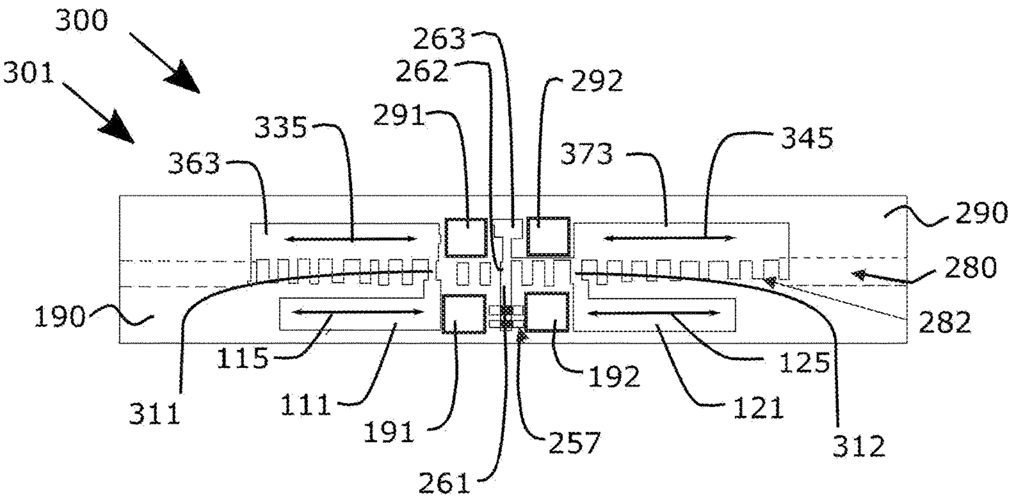
FIG. 3 illustrates a slot antenna assembly.

FIG. 3 illustrates a slot antenna assembly 300, e.g., for a portable electronic device (PED) assembly 301. The slot antenna assembly 300 is comparable to that of FIGS. 1, 2*a* and 2*b*, for example, and the features described with regard to FIGS. 1, 2*a*, 2*b*, and 3 can be combined. The slot antenna assembly 300 of FIG. 3 has an opposite antenna slot 363 in the opposite substrate 290 which has an opposite slot long axis 335 which is parallel to the first slot long axis 115. The opposite antenna slot 363 can be opposite the first slot 111. As depicted in FIG. 3, the slot antenna assembly 300 can include a second opposite antenna slot 373 in the opposite substrate 290 which has a second opposite slot long axis 345 parallel to the second slot long axis 125. As illustrated, the second opposite antenna slot 373 can be opposite the second slot 121. Alignment of the long axes can save space on the PED, and possibly allow for more antennas to fit on the same device.

The opposite antenna slot 363 can be connected to the first antenna slot 111 by a first slot portion 311 which extends along the edge portion 280. Optionally, the second opposite antenna slot 373 is connected to the second antenna slot 121 by a second slot portion 312 which also extends along the edge portion 280.

At least part of the isolation slot 160 and/or conductor 270 can be between the first slot long axis 115 and the second slot long axis 125. Providing an isolation mechanism, such as a slot and/or conductor, between nearby long axes of slot antennas can be particularly effective at reducing coupling. Alternatively/additionally, the isolator 150 can include an RC and/or LRC circuit 257, corresponding to the descriptions herein in regard to other figures.

The isolation slot 160 can include an edge isolation slot 262 which may extend from the substrate isolation slot 261 along the edge portion 280 of the slot antenna assembly 300. The edge isolation slot 262 can connect the substrate isolation slot 261 to an opposite substrate isolation slot 263.

Providing such an isolation slot 160 may aid in reducing coupling between the slot antennas 110, 120. An isolation slot 160 that has a portion, e.g., the substrate isolation slot 161, between the first and second antenna slots 111, 121 in the substrate 190; and another portion, e.g., the opposite substrate isolation slot 263, which is between the opposite antenna slots 363, 373 on the opposite substrate 290 may be particularly effective at reducing coupling between the slot antennas 110, 120.

FIG. 3 also illustrates the first portion 191 and second portion 192 of the substrate 190, as well as a corresponding opposite first portion 291 and opposite second portion 292 of the opposite substrate 290. The conductor 270 may connect the inner surfaces 197, 297 of the substrate and opposite substrates (i) at portions 191 and 291 of the substrate 190 and opposite substrate 290, and (ii) at portions 192 and 292 of the substrate 190 and opposite substrate 290. The opposite substrate isolation slot 263 can separate the portions 291 and 292 of the opposite substrate 290. The opposite first portion 291 can be between the opposite substrate isolation slot 263 and the opposite antenna slot 363. The opposite second portion 292 can be between the opposite substrate isolation slot 263 and the second opposite antenna slot 373. A conductor 270 which connects the inner surfaces 197, 297 of the substrates 190, 290 near the isolation slot 160 can aid in reducing coupling between the antennas.

The first portion 191 of the substrate 190 is at the first side (in FIG. 3 the first side is to the left of the isolation slot(s) in the middle of the figure) of the substrate isolation slot 261 by the first slot 111. The second portion 192 of the substrate 190 is at the second side (right of the vertical slot of FIG. 3) of the substrate isolation slot 261 by the second slot 121.

The opposite first portion 291 of the opposite substrate 290 is at the first side of the opposite substrate isolation slot 263 by the first opposite antenna slot 363 (in FIG. 3 the first side is to the left of the isolation slot(s) in the middle of the figure). The opposite second portion 292 of the opposite substrate 290 is at the second side of the opposite substrate isolation slot 263 by the second opposite antenna slot 373. As illustrated in FIG. 3, the isolation slot(s), and portions thereof, may pass through the substrate 190 (and/or opposite substrate 290) so that the first and second portions 191 and 192 of the substrate 190 (and/or portions 291 and 292 in the opposite substrate 290) may be separated in the plane 195 of the substrate 190 (and/or the plane of the opposite substrate) by the substrate isolation slot 261 (and/or opposite substrate isolation slot 263).

The conductor 270, e.g., as illustrated in FIG. 2*b*, may connect portion 191 to portion 291, and connect portion 192 to portion 292, the portions being shown in FIG. 3.

As illustrated in FIG. 3, the substrate isolation slot 261 is between first and second portions 191, 192 of the substrate 190, and the opposite substrate isolation slot 263 is between corresponding opposite first and second portions 291, 292 of the opposite substrate 290. The first portion 191 of the substrate is connected by the conductor 270 to the opposite first portion 291 of the opposite substrate 290. The second portion 192 of the substrate 190 is connected by the conductor 270 to the opposite second portion 292 of the opposite substrate 290.

As illustrated in FIG. 3, at least part of the substrate isolation slot 161, 261 is between the first slot long axis 115 and the second slot long axis 125. Alternatively/additionally, portions 191, 192 of the substrate 190 which are in contact with the conductor 270 are between the first slot long axis 115 and the second slot long axis 125. Alternatively/additionally, the conductor 270 may conductively connect the substrate 190 between the first and second slots 111, 121 (of the first and second antennas) to the opposite substrate 290, e.g., between the opposite antenna slot 363 and second opposite antenna slot 373. An isolator 150 formed as such may effectively reduce coupling between nearby antennas.

The slot antenna assemblies described herein may have first and second slot antennas separated by at least 5 mm and up to 30 mm, or up to 20 mm, or up to 15 mm. It is desirable to have closely spaced slot antennas so that more antennas can be fit onto a device and/or the device can be made smaller. The various forms of isolation mechanisms, e.g., isolators 150 as described herein may be particularly effective at reducing coupling of such closely spaced antennas.

Figure 4:
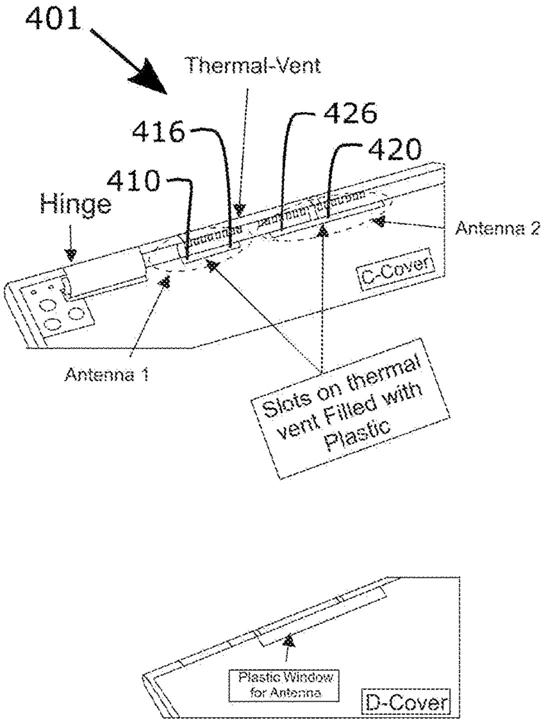
FIG. 4 illustrates a PED assembly.

FIG. 4 illustrates a PED assembly 401. The PED assembly 401 may include the slot antenna assemblies as described herein. The PED assembly 401 may include a C-cover and D-cover, as shown. FIG. 4 illustrates that the slot antennas and/or isolation slots described herein may include nonconductive windows. The slots may be filled with plastic, for example. For example, there is a first nonconductive window 416 that covers the first slot antenna 410 (Antenna 1), and a second nonconductive window 426 that covers the second slot antenna 420 (Antenna 2). The nonconductive windows may form a flush surface with the outer surface of the substrate, cover, and/or device. A nonconductive slot window may also cover any isolation slot(s), as shown in FIG. 5.

Figure 5:
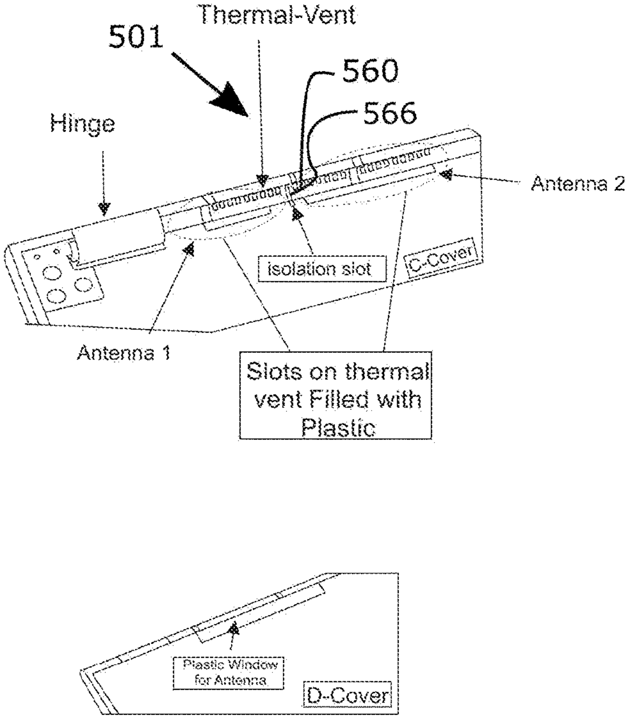
FIG. 5 illustrates a PED assembly.

FIG. 5 illustrates a PED assembly 501. The PED assembly 501 may include a C-cover and D-cover, as shown. FIG. 5 may include the features as described for FIG. 4. FIG. 5 shows a nonconductive slot window which covers an isolation slot. The isolation slot can extend to between the long axes of the antennas in the C-cover. The illustration of FIG. 5 may be comparable to that of FIGS. 1 and/or 2*a*. A nonconductive slot window 566 may cover the isolation slot 560.

Figure 6:
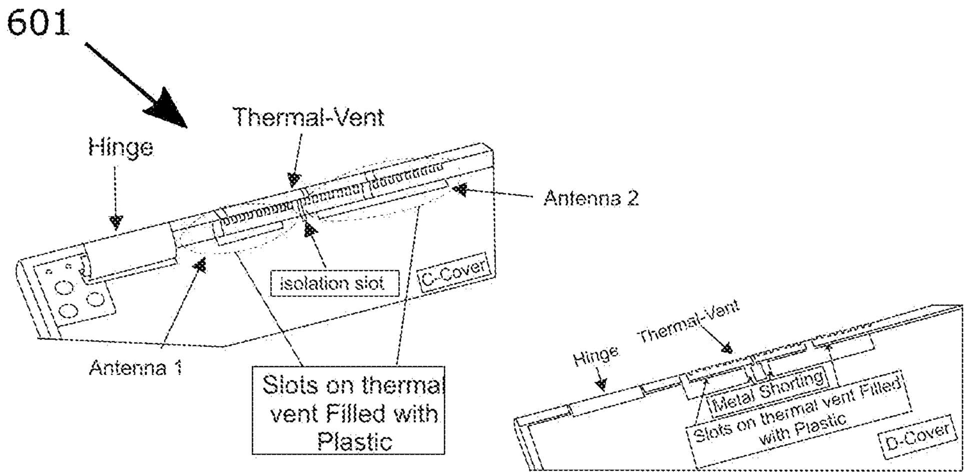
FIG. 6 illustrates a PED assembly.

FIG. 6 illustrates a PED assembly 601. The PED 601 may include a C-cover and D-cover, as shown. FIG. 6 may include the features as described for FIGS. 4 and/or 5. The illustration of FIG. 6 may be compared to that of FIG. 3. FIG. 6 shows an isolation slot. The isolation slot may be regarded as including a substrate isolation slot on the C-cover. The isolation slot may also include an edge isolation slot which may meet the substrate isolation slot in the C-cover. The edge isolation slot may also connect and/or extend to an opposite substrate isolation slot, e.g., to the D-cover. The isolation slot may extend between the long axes of the antenna slots in the C-cover and between the long axes of the antenna slots in the D-cover. For example, the opposite substrate isolation slot of the isolation slot may include a portion between the long axes of the antenna slots in the D-cover (the opposite substrate). FIG. 6 also indicates that metal shorting, e.g., the conductor 270 described herein, can connect to the region of the substrate between the antenna slots. The metal shorting may connect the D-cover to the C-cover, via the inner surfaces.

Figure 7:
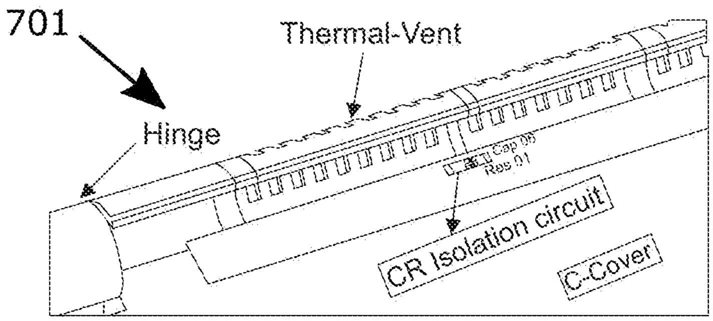
FIG. 7 illustrates a PED assembly.

FIG. 7 illustrates a PED assembly 701. The PED assembly 701 illustrates the optional RC and/or LRC circuit, as described herein, for example, with respect to FIGS. 1, 2 and 3. FIG. 7 shows a capacitor CAP06 and a resistor Res01 which may form at least part of the optional RC and/or LRC circuit.

Figure 8:
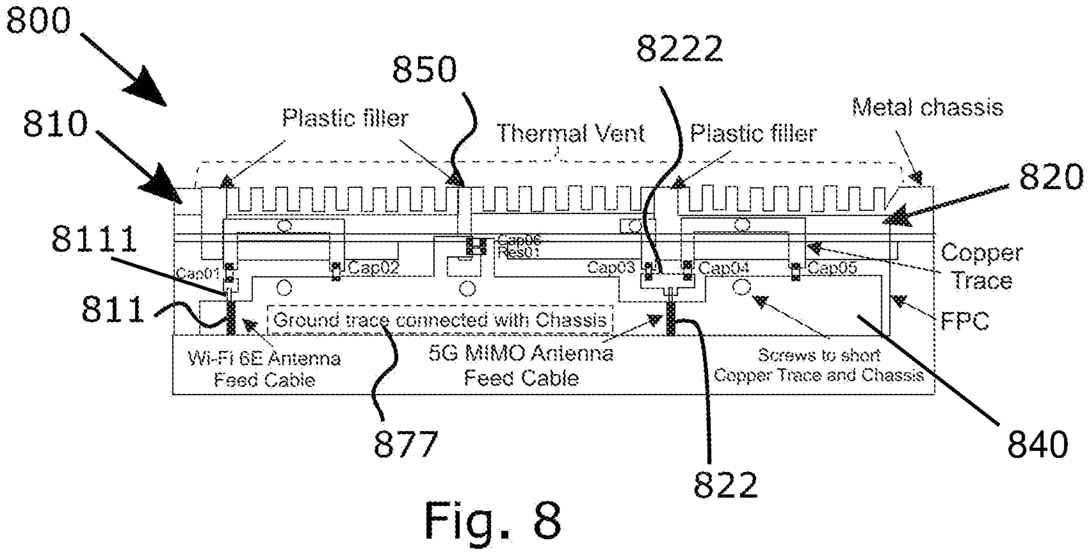
FIG. 8 illustrates schematically a slot antenna assembly.

FIG. 8 illustrates schematically a slot antenna assembly 800. The features described with respect to FIG. 8 can be combined with other antenna assemblies described herein. For example, FIG. 8 shows the optional RC and/or LRC circuit, as described herein, with reference to FIGS. 1, 2, 3, and 7. FIG. 8 shows the capacitor CAP06 and the resistor Res01 which may form at least part of the optional RC and/or LRC circuit.

The slot antenna assembly 800 may include a circuit board 840 which includes the capacitor CAP06 and the resistor RES01. The circuit board 840, e.g., a flexible printed circuit, can include a ground trace 877 which may be conductively connected to the substrate 190 and/or opposite substrate 290, e.g., through screws and/or other conductors. The ground trace 877 may be grounded to the substrate(s) and/or chassis (e.g., metal chassis), such as by conductive screws. The ground trace 877 can be coupled, e.g., capacitively coupled, to a first antenna feed 811 for the first slot antenna 810 and a second antenna feed 822 for the second slot antenna 820.

FIG. 8 shows a first capacitor CAP01 and second capacitor CAP02 which can capacitively couple the first antenna feed 811 to the ground trace 877. A second antenna feed 822 can be capacitively coupled via capacitors CAP03, CAP04, and CAP05 to the ground trace 877. FIG. 8 also shows plastic filler which can be used as the material for a nonconductive slot window for the antenna slots and/or isolation slot(s). In FIG. 8, the first antenna feed 811 is for a Wi-Fi 6E antenna. Other types and/or tunings of slot antennas are also possible. In FIG. 8, the second antenna feed 822 is for a 5G MIMO antenna. Other types and/or tunings of slot antennas are also possible. The first antenna feed 811 may be coupled to a first trace 8111 which couples the first antenna feed 811 (e.g., an Rf cable) to the first slot antenna 810. The second antenna feed 822 may be coupled to a second trace 8222 which couples the second antenna feed 822 (e.g., an Rf cable) to the second slot antenna 820.

The thermal vent illustrated in FIG. 8 can be in the form of cut-outs in the edge portion of the slot antenna assembly 800, such as is comparably described elsewhere herein. The slot antenna assembly 800 may include an isolator 850 as described herein, such as a slot and RC circuit (as shown).

Many of the components of FIG. 8 can be on a flexible printed circuit (FPC), as indicated, such as the traces and/or RC circuit. The FPC can be placed over the antenna slot(s). The antenna(s) can be coupled, e.g., electromagnetically, to the Rf cable connections and/or feeds. The RC and/or LRC circuit can be included, on the FPC, in alignment with the isolation slot. The isolation performance can be, for example, improved over a narrow band like 2.4-2.5 GHz in a Wi-Fi Antenna. The optional inductor may be oriented to increase damping. Increased damping may improve isolation.

The slot antennas described herein can be excited in at least two ways: (a) a direct short feed and (b) a proximity coupled feed. FIG. 8 shows a FPC which can be designed to excite the slot antennas. A FPC conductive trace (e.g., metal, copper) can be used to excite the slot. The screws can be used to short the conductive trace with the chassis. A coaxial cable can be soldered to the metal strip (e.g., feed point) and connected to a Rf-module. FIG. 8 shows a few discrete components (e.g., Cap01, Cap02, Cap03, Cap04, and Cap05) which can also be used in the design, such as to achieve good impedance matching and bandwidth.

The Cap06 and Res01 components can be implemented, particularly in parallel, across the isolation slot. The Cap06 and Res01 components can improve the isolation between both 5G-MIMO and Wi-Fi antennas. Other types of slot antennas and/or bands are also contemplated. The RC and/or LRC circuit can improve the isolation for a band of frequency. The RC and/or LRC circuit can be tunable, e.g., to improve isolation for a target frequency and/or target frequency band.

Figure 9:
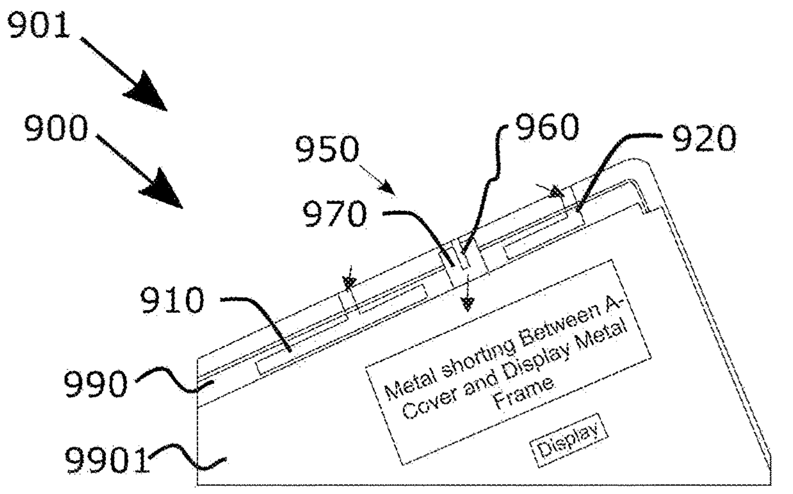
FIGS. 9 and 10 illustrate a portable electronic device assembly.
Figure 10:
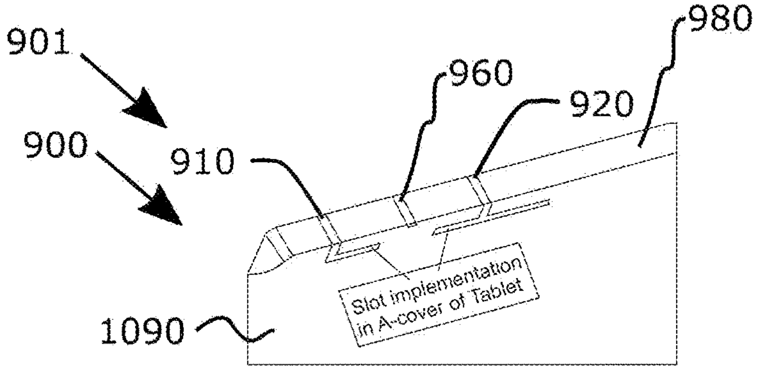

FIGS. 9 and 10 illustrate a portable electronic device assembly 901. The PED 901 includes a slot antenna assembly 900 which is comparable to slot antenna assemblies described herein with regard to other figures. Between the first and second slot antennas 910, 920, there is an isolator 950. A conductor 970 (e.g., metal shorting) of the isolator 950 may connect the inner surface of a substrate 990, such as a metal frame around a display 9901, to an opposite substrate 1090 at the back of the PED 901. The opposite substrate 1090 may be an A-cover for a tablet.

The isolator 950 may include an isolation slot 960, which may be comparable to isolation slots described herein with regard to other figures. For example, the isolation slot 960 may include a substrate isolation slot on the substrate 990, and edge isolation slot along an edge portion 980 of the slot antenna assembly 900. The edge isolation slot may connect to the substrate isolation slot.

The slot antennas 910, 920 may include slot long axes on the substrate 990, for example, comparable to the slot antennas described herein with regard to other figures. For example, the slot antennas can have antenna slots on the substrate 990, and opposite antenna slots on the opposite substrate 1090. The antenna slots on the substrate can be connected to the opposite antenna slots on the opposite substrate 1090 by slot portions which may extend along the edge portion 980 of the slot antenna assembly 900. Connected slot portions of antennas may add is transmission and/or reception efficiency.

The slot antenna assembly can be implemented in a tablet, such as at least partially in an A-cover. The conductor 970, or metal shorting, can be implemented between an A-Cover and a display metal frame. The slot antenna assembly can achieve wideband isolation improvement. The isolation slot can be at least partially on the edge portion 980 of the slot antenna assembly 900, e.g., on the side wall of the A-cover.

Figure 11:
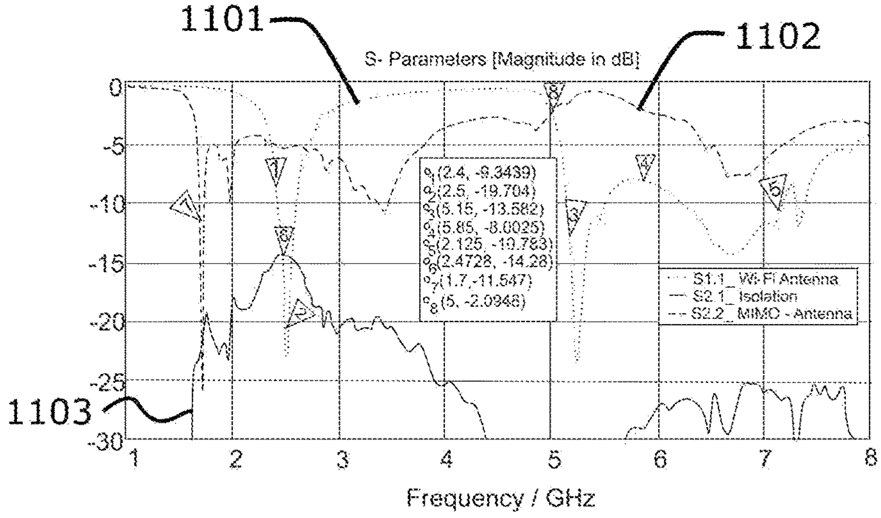
FIG. 11 illustrates simulation results for an antenna configuration.

FIG. 11 illustrates simulation results for an antenna configuration. The horizontal axis is frequency and the vertical axis is decibel (dB). The plots 1101, 1102, 1103 are representative of S-parameters versus frequency, obtained from simulations. As an example, port-01 of a slot antenna assembly is tuned for 5G MIMO frequency band (1.8-2.7 GHz and 3.3-5.0 GHz) and Port-02 is tuned for Wi-Fi-6E frequency bands (2.4-2.5 GHz and 5.15-7.125 GHz). The simulated S-parameter result is given in FIG. 11, for the first antenna 1101 (S11) and the second antenna 1102 (S22). Both slot antennas give good return loss for operating bands and have good impedance matching with 50Ω. The isolation (S21, see curve 1103) between the first antenna (5G MIMO) and the second antenna (Wi-Fi) is better than −15 dB. The achieved return loss or impedance bandwidth can be adequate for 5G MIMO and Wi-Fi6E antenna design.

Figure 12:
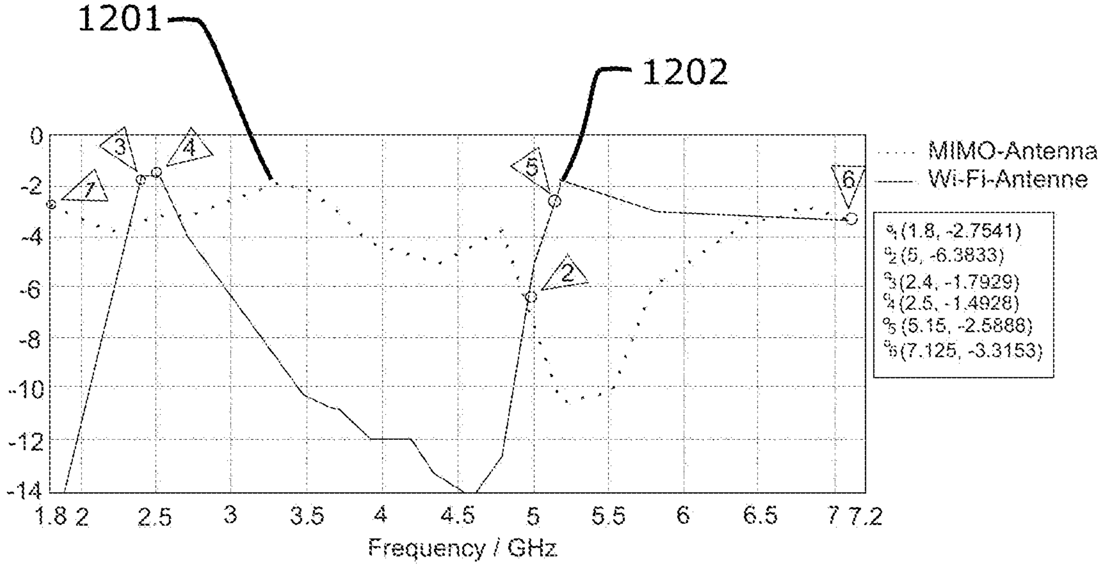
FIG. 12 illustrates simulated antenna efficiency.

FIG. 12 illustrates simulated antenna efficiency. The horizontal axis is frequency and the vertical axis is decibel (dB). The plots 1201 and 1202 are representative of antenna radiation efficiency versus frequency, obtained from simulation, such as for the slot antenna assembly used for FIG. 11. The 5G MIMO antenna radiation efficiency is about −3 dB for 2 GHz band and about −4 dB for 4 GHz band. Similarly, the Wi-Fi antenna radiation efficiency is about −1.6 dB for 2.4 GHz band and about-3 dB for 5 GHz band.

Figure 13:
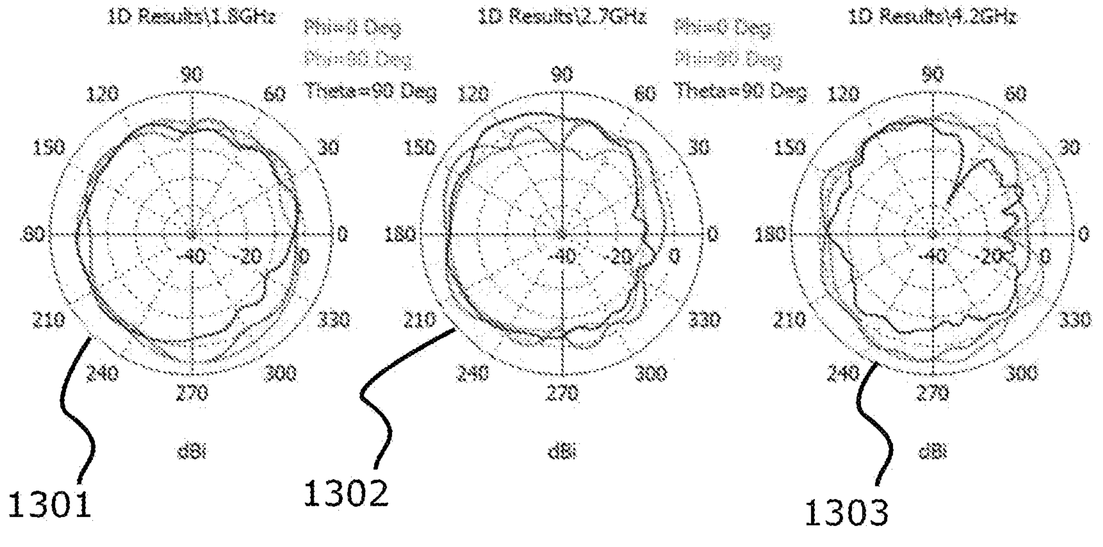
FIG. 13 illustrates radiation patterns.
Figure 14:
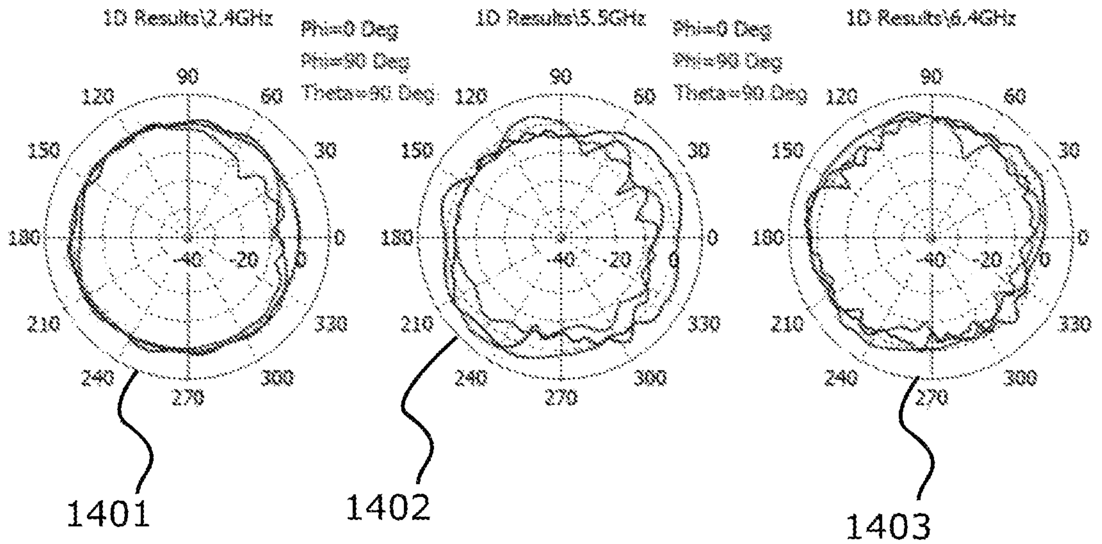
FIG. 14 illustrates radiation patterns.

FIG. 13 illustrates radiation patterns. FIG. 13 is representative of simulation results. The radiation pattern is shown for three 5G MIMO frequencies 1.8 GHz, 2.7 GHz and 4.2 GHz (polar plots 1301, 1302, 1303, left to right). Results in each polar plot 1301, 1302, 1303 of FIG. 14 are shown for angles Phi=0°, Phi=90° and Theta=90°. The Phi=0° and phi=90° are the vertical cut of an antenna assembly and theta 90° is a horizontal cut of the antenna assembly, such as that simulated in FIGS. 11 and 12. Three cuts in the pattern can provide information to an analyzer about radiation angle coverage.

FIG. 14 illustrates radiation patterns. FIG. 14 is representative of simulation results. The radiation pattern is shown for three Wi-Fi frequencies 2.4 GHz, 5.5 GHz and 6.4 GHz (polar plots 1401, 1402, 1403, left to right). Results in each polar plot 1401, 1402, 1403 of FIG. 14 are shown for angles Phi=0°, Phi=90° and Theta=90°. The Phi=0° and phi=90° are the vertical cut of an antenna assembly and theta 90° is a horizontal cut of the antenna assembly, such as that simulated in FIGS. 11 and 12. The radiation pattern shows that the antenna has an omnidirectional pattern and does not have a sharp null in any direction at the frequencies.

Figure 15:
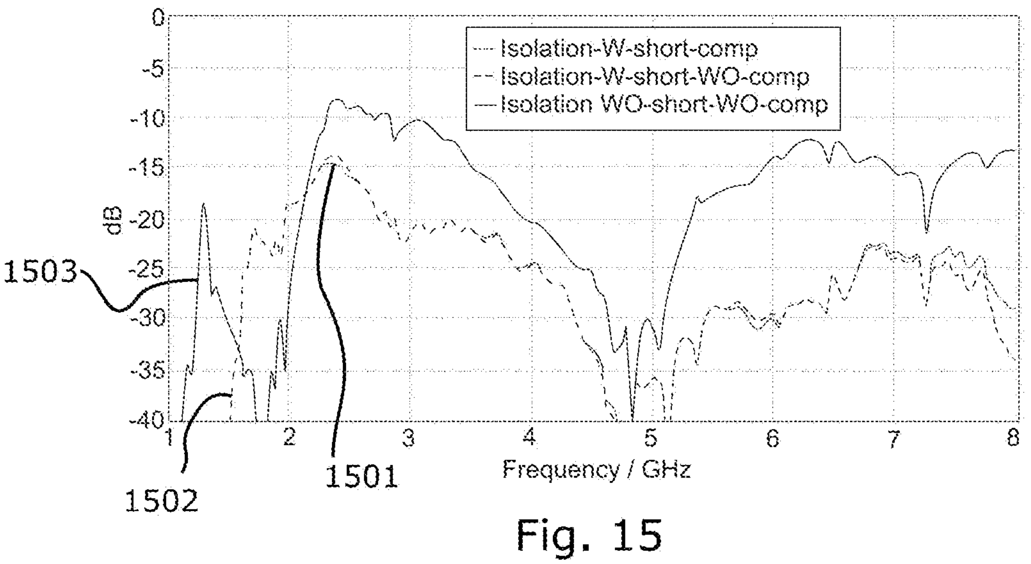
FIG. 15 illustrates simulation results for an antenna assembly configuration.
Figure 16:
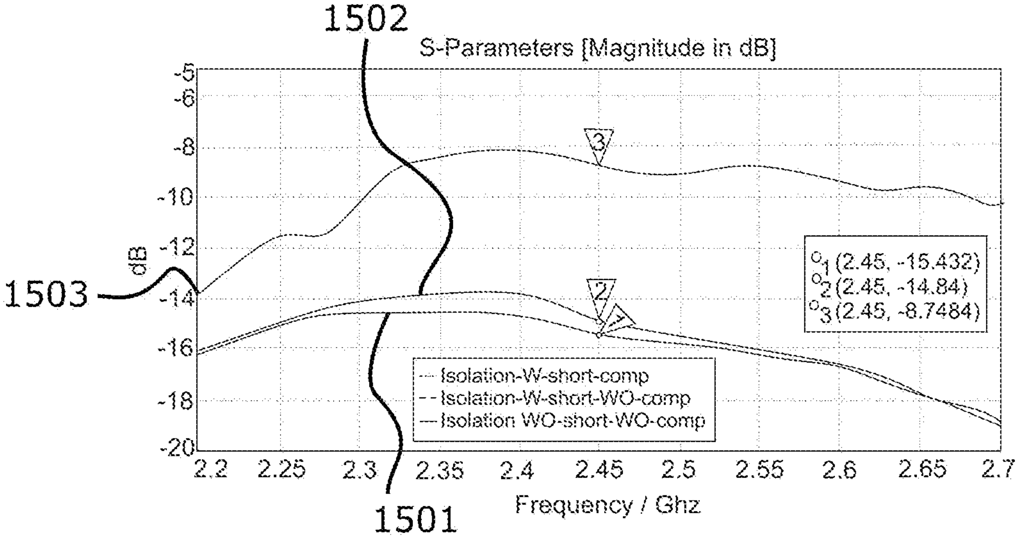
FIG. 16 illustrates simulation results for an antenna assembly configuration.

FIGS. 15 and 16 each illustrate simulation results for an antenna assembly configuration. The horizontal axis is frequency and the vertical axis is decibel (dB). The plots 1501, 1502, 1503 are representative of isolation S-parameters versus frequency obtained from simulations. FIGS. 15 and 16 are representative of simulated results for an antenna assembly configuration shown in FIGS. 6 and 7, e.g., with an isolation slot and an optional RC circuit. Case 1503 is one in which there is no conductor (e.g., no conductor 270 as described herein) and there is no RC circuit. Case 1502 is one in which there is a conductor (e.g., conductor 270 as described herein) and no RC circuit. Case 1501 is a case in which there is a conductor (e.g., conductor 270 as described herein) and an RC circuit (e.g., an RC circuit as described herein).

FIG. 16 illustrates the range from 2.2-2.7 GHz. The plots 1501, 1502, 1503 are representative of isolation S-parameters versus frequency obtained from simulations.

FIGS. 15 and 16 show, for case 1503, without a conductor (no metal shorting) and no RC circuit, the isolation parameter (S21 dB) is relatively high (−8 dB) for frequency band 2-2.7 GHz and it is close to −12 dB for frequency band 5.5-7.125 GHz. Adding a conductor (see case 1502) as described herein, (e.g., metal shorting) can improve the isolation performance, in the simulation of FIGS. 15-16, by about 6 dB at the 2.4 GHz band and by around 15 dB in high frequency and ultra-high frequency (HF and UHF) bands. A further approximate 1 dB improvement in isolation for narrow Wi-Fi low-band can be achieved (see 1501) by adding an RC circuit, as described herein, e.g., between the antennas, e.g., between antenna-1 (e.g., an L-slot for Wi-Fi) and antenna-2 (e.g., a T-slot for 5G-MIMO). The RC circuit, which can be comparable to the RC and/or LRC circuits described herein, can be on a flexible printed circuit (FPC), for example.

A conductor, such as those described herein, e.g., a conductor 270 and/or metal shorting, can improve isolation and efficiency parameters for at least one antenna of a slot antenna assembly such as those described herein, e.g., of at least one of Wi-Fi and 5G-MIMO antennas of a slot antenna assembly.

Figure 17:
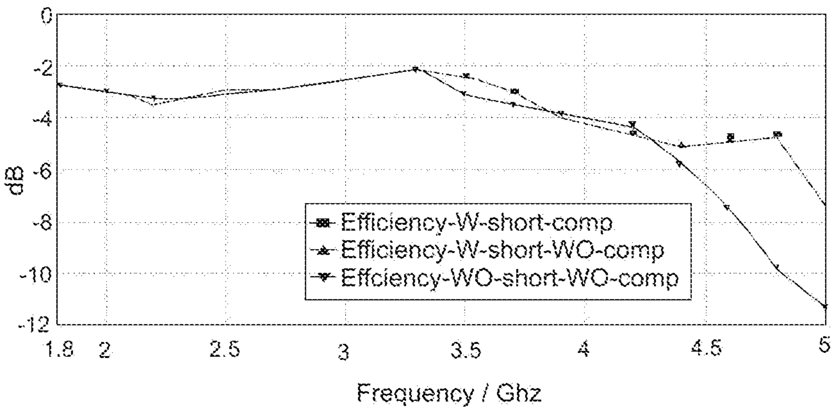
FIG. 17 illustrates efficiency variation.
Figure 18:
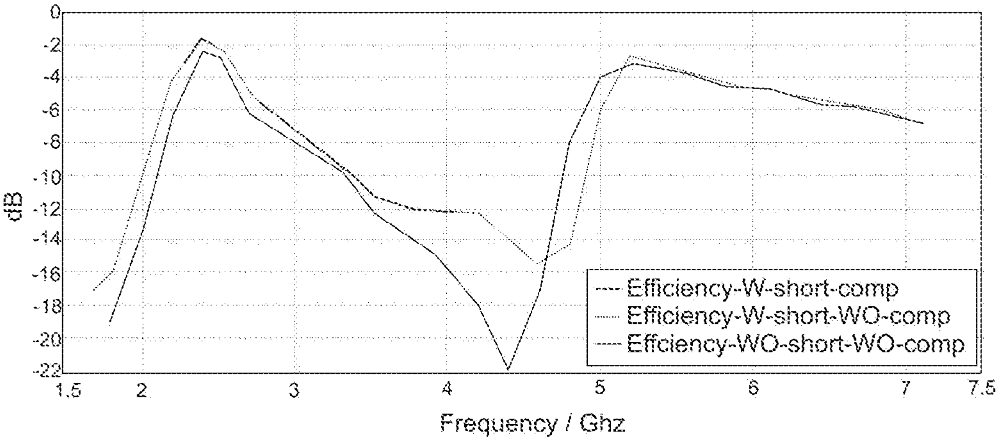
FIG. 18 illustrates efficiency variation.

FIGS. 17 and 18 illustrate efficiency variation. The efficiency variation with and without an isolator (e.g., a conductor and RC circuit) are shown for 5G-MIMO (FIG. 17) and Wi-Fi (FIG. 18). As seen in FIG. 17, there can be an efficiency improvement in the MIMO antenna efficiency at higher frequencies with an isolator, and efficiency can be approximately the same at lower frequencies.

For a WiFi antenna, the isolator (e.g., a conductor and RC and/or LRC circuit) can improve antenna efficiency for the operating bands (2.4-2.5 GHz and 5.15-7.125 GHz). The RC circuit can have little negative impact (drop by 0.3 dB) on efficiency performance (FIG. 18) and there can be an improvement of 1 dB isolation (FIG. 16).

The slot antenna assemblies described herein can be used in lighter, thinner and bezel-less systems, such as PEDs, particularly those that use full metal chassis. The PEDs may have at least two antennas on the base, and possibly all the antennas on the base. Six or more antennas can be integrated on a slot antenna assembly and/or PED. Numerous technical challenges can arise, such as if the antennas are placed close to each other. A drop in wireless through-put can be possible without adequate isolation.

Herein, the isolation problem can be addressed. The PEDs and/or slot antenna assemblies described herein can utilize printed circuit board (PCB) components and/or flexible circuits, e.g., in the base, such as integrated with the C-cover and/or D-cover. Nonconductive slot windows are contemplated for antennas and isolation slots, e.g., in both C-covers and D-covers. The slot antenna assemblies described herein may allow for reduction of the size of the slots and/or more flexibility in placement of the slots, which can improve the PED mechanical properties, e.g., by reducing the cut-outs of the metal chassis. The slot antenna assemblies described herein may maintain high mechanical structural performance and maintain a premium sleek look. The windows herein can be made by thermal bonding or molding The antenna assemblies are particularly contemplated for combinations of at least two of 5G, LTE, MIMO, and/or WIFI-6E antenna combinations. The isolators described herein can improve antenna performance such as by reducing loss of impedance matching and maintaining high radiation efficiency when the antennas come close to metal. The slot antenna assemblies herein can work with minimum KOZ (keep out zone) from metal components in the system.

The isolators as described herein may improve isolation between two antennas placed close to each other without degrading antenna efficiency.

The slot antenna assemblies described herein are suitable to implement in systems/devices for 5G/LTE/MIMO/WIFI-6E wireless with minimum required keep out zone.

The antenna assemblies described herein allow ODM/OEM to design bezel-less or narrow bezel LID/display.

Herein is disclosed an isolation slot (e.g., a metal cutout) between two antennas. A metal strip (e.g., the conductor described herein), such as a metal strip between the antennas, can have a shunt RC and/or LRC circuit (RC/LRC circuit). The RC/LRC circuit may improve the isolation for a frequency band. The RC and/or LRC circuit may be tuned for the frequency band.

Herein is disclosed a conductor, or metal shorting, provided between a C-cover and D-cover. The metal shorting can be given on the D-cover plastic window side and between two slot antennas. The metal shorting can improve the isolation for wide frequency band.

The slot antennas described herein can be magnetic dipole antennas. Slot antenna can have a λ/2 (half wavelength) long axis cut in a substrate, metal chassis and/or ground plane. The antennas described herein can be excited at the center. The λ/2 length slot antennas can possibly be divided in half and form λ/4 electrical length open ended slot antenna. A λ/4 length open ended slot antenna may be an analogy of monopole antenna and have similar radiation characteristics. A target minimum isolation between two antennas is −15 dB for wireless performance.

Herein, the slot antenna assembly may be formed at least partially on thermal vent structures of a laptop. The first and second antennas described herein may be L-shaped and/or T-shaped, such as one L-shaped and one T-shaped antenna. An L-slot (first antenna) and T-slot (second antenna) combination can be used, for example, in a combination antenna assembly that includes at least two of: 5G, LTE, MIMO, and/or WIFI-6E antennas.

Herein are disclosed the following enumerated examples. Reference numerals are to aid understanding and are not limiting.

Enumerated example 1 is a slot antenna assembly (100) for a portable electronic device, including a first slot antenna (110) including a first slot (111) through a substrate (190) from an outer surface of the substrate to an inner surface of the substrate, a second slot antenna (120) including a second slot (121) through the substrate (190) from the outer surface of the substrate to the inner surface of the substrate, and an isolator (150) which includes at least one of: an isolation slot (160) including a substrate isolation slot (161) which extends through the substrate (190) between the first and second slot antennas (110, 120); and a conductor (270) which connects the inner surface (197) of the substrate (190) between the first and second antennas (210, 220) to an opposite inner surface (297) of an opposite substrate (290) opposite the inner surface (197) between the first and second antennas (210, 220).

Enumerated example 2 is the slot antenna assembly of any preceding enumerated example, wherein the isolation slot (160) includes an edge isolation slot (262) which extends from the substrate isolation slot (261) along an edge portion (280) of the slot antenna assembly, wherein optionally the edge isolation slot (262) connects the substrate isolation slot (261) to an opposite substrate isolation slot (263).

Enumerated example 3 is the slot antenna assembly of any preceding enumerated example, further comprising a first nonconductive window (416) which covers the first slot antenna (410); a second nonconductive window (426) which covers the second slot antenna (420), and optionally a nonconductive slot window (566) covering the isolation slot (560).

Enumerated example 4 is the slot antenna assembly of any preceding enumerated example, wherein the substrate isolation slot (261) is between a first portion (191) and a second portion (192) of the substrate (190), wherein the first portion (191) is between the substrate isolation slot (261) and the first slot (111), the second portion (192) is between the substrate isolation slot (261) and the second slot (121), and the conductor (270) connects the first portion (191) of the substrate (190), from the inner surface (197) of the substrate (190), to the opposite inner surface (297), and the conductor (270) directly connects the second portion (192) of the substrate (190), from the inner surface (197) of the substrate (190), to the opposite inner surface (297).

Enumerated example 5 is the slot antenna assembly of any preceding enumerated example, wherein the isolator (150) includes a capacitor (152) and a resistor (154) in parallel, and the isolator (150) optionally includes an inductor (156).

Enumerated example 6 is the slot antenna assembly of enumerated example 5, wherein the capacitor (152) and the resistor (154), and optionally the inductor (156), each electrically connect the first portion (191) of the substrate (190) to the second portion (192) of the substrate (190), and optionally the capacitor and resistor span across the substrate isolation slot (261).

Enumerated example 7 is the slot antenna assembly of any of enumerated examples 4-6, further comprising a circuit board (840) which includes the capacitor (CAP06) and the resistor (RES01) and a ground trace (877) which is conductively connected to the substrate (190), wherein optionally the ground trace (877) is coupled to a first antenna feed (811) for the first slot antenna (810) and a second antenna feed (822) for the second slot antenna (820).

Enumerated example 8 is the slot antenna assembly (100) of any preceding enumerated example, wherein the first slot (111) includes a first slot long axis (115) in a plane (195) of the substrate (190), the second slot (121) includes a second slot long axis (125) which is aligned with the first slot long axis (115) in the plane (195) of the substrate (190).

Enumerated example 9 is the slot antenna assembly of enumerated example 8, wherein at least part of the substrate isolation slot (161, 261) intersects an imaginary line (219) along the first slot long axis (115) and the second slot long axis (125).

Enumerated example 10 is the slot antenna assembly (100) of enumerated example 8, wherein a first and second portions (191, 192) of the substrate (190) are along an imaginary line along the first slot long axis (115) and the second slot long axis (125), wherein the first portion (191) is between the substrate isolation slot (261) and the first slot (111), and the second portion (192) is between the substrate isolation slot (261) and the second slot (121).

Enumerated example 11 is a portable electronic device assembly (201, 301) comprising the slot antenna assembly (100, 200, 300) of any preceding enumerated example, and a cover which includes the substrate, the first slot, and the second slot.

Enumerated example 12 is the portable electronic device assembly of enumerated example 11, further comprising an outer surface (299) which is outer to the inner surface (197) and outer to the opposite inner surface (297).

Enumerated example 13 is the portable electronic device assembly of enumerated example 10 or 11, further comprising a C-cover for a laptop which includes the substrate, and a D-cover for the laptop which includes the opposite substrate; or an A-cover for a tablet which includes the substrate, and a display frame for a tablet which includes the opposite substrate.

Enumerated example 14 is the portable electronic device assembly of any of enumerated examples 11-13, further comprising: an opposite antenna slot (363) in the opposite substrate (290) having an opposite slot long axis (335) parallel to the first slot long axis (115), wherein the opposite antenna slot (363) is opposite the first slot (111); and optionally a second opposite antenna slot (373) in the opposite substrate (290) having a second opposite slot long axis (345) parallel to the second slot long axis (125), wherein the second opposite slot (373) is opposite the second slot (121).

Enumerated example 15 is the portable electronic device assembly of enumerated example 14, wherein the opposite antenna slot (363) is connected to the first slot (111) by a first slot portion (311) which extends along an edge portion (280), and optionally the second opposite antenna slot (373) is connected to the second slot (121) by a second slot portion (312) which extends along the edge portion (280).

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A slot antenna assembly for a portable electronic device, comprising:

a first slot antenna including a first slot through a substrate from an outer surface of the substrate to an inner surface of the substrate, a second slot antenna including a second slot through the substrate from the outer surface of the substrate to the inner surface of the substrate, an opposite substrate having an inner surface which is opposite to the inner surface of the substrate, and an isolator which includes at least an isolation slot which extends through the substrate between the first and second slot antennas, wherein the isolation slot is a substrate isolation slot.

2. The slot antenna assembly of claim 1, wherein:
the isolation slot includes an edge isolation slot which extends from the substrate isolation slot along an edge portion of the slot antenna assembly, wherein
the edge isolation slot connects the substrate isolation slot to an opposite substrate isolation slot.

3. The slot antenna assembly of claim 1, further comprising:
a first nonconductive window which covers the first slot antenna;
a second nonconductive window which covers the second slot antenna, and
a nonconductive slot window covering the isolation slot.

4. The slot antenna assembly of claim 1, wherein the substrate isolation slot is between a first portion and a second portion of the substrate, wherein:
the first portion is between the substrate isolation slot and the first slot,
the second portion is between the substrate isolation slot and the second slot, wherein
the isolator includes a capacitor and a resistor in parallel.

5. The slot antenna assembly of claim 4, wherein:
the capacitor and the resistor each electrically connect the first portion of the substrate to the second portion of the substrate, and optionally
the capacitor and resistor span across the substrate isolation slot.

6. The slot antenna assembly of claim 4, further comprising a circuit board which includes the capacitor and the resistor and a ground trace which is conductively connected to the substrate.

7. The slot antenna assembly of claim 6, wherein the ground trace is coupled to a first antenna feed for the first slot antenna and a second antenna feed for the second slot antenna.

8. The slot antenna assembly of claim 1, wherein:
the first slot includes a first slot long axis in a plane of the substrate,
the second slot includes a second slot long axis which is aligned with the first slot long axis in the plane of the substrate.

9. The slot antenna assembly of claim 8, wherein at least part of the substrate isolation slot intersects an imaginary line along the first slot long axis and the second slot long axis.

10. The slot antenna assembly of claim 8, wherein:
a first and second portions of the substrate are along an imaginary line along the first slot long axis and the second slot long axis, wherein
the first portion is between the substrate isolation slot and the first slot, and
the second portion is between the substrate isolation slot and the second slot.

11. A slot assembly for a portable electronic device, comprising:
a first slot antenna including a first slot through a substrate from an outer surface of the substrate to an inner surface of the substrate,
a second slot antenna including a second slot through the substrate from the outer surface of the substrate to the inner surface of the substrate, and
an isolator which includes:
a conductor which connects the inner surface of the substrate between the first and second antennas to an opposite inner surface of an opposite substrate opposite the inner surface between the first and second antennas.

12. The slot antenna assembly of claim 11, wherein the isolator further includes an isolation slot including a substrate isolation slot which extends through the substrate between the first and second slot antennas.

13. The slot antenna assembly of claim 12, wherein the substrate isolation slot is between a first portion and a second portion of the substrate, wherein:
the first portion is between the substrate isolation slot and the first slot, the second portion is between the substrate isolation slot and the second slot, and
the conductor connects the first portion of the substrate, from the inner surface of the substrate, to the opposite inner surface, and
the conductor directly connects the second portion of the substrate, from the inner surface of the substrate, to the opposite inner surface.

14. The slot antenna assembly of claim 13, wherein the isolator includes a capacitor and a resistor in parallel.

15. The slot antenna assembly of claim 14, wherein the capacitor and the resistor each electrically connect the first portion of the substrate to the second portion of the substrate.

16. A portable electronic device assembly comprising;
a cover which includes a substrate, a first slot, and a second slot; and
a slot antenna assembly, including:
a first slot antenna including the first slot through a substrate from an outer surface of the substrate to an inner surface of the substrate,
a second slot antenna including the second slot through the substrate from the outer surface of the substrate to the inner surface of the substrate,
an opposite substrate having an inner surface which is opposite to the inner surface of the substrate, and
an isolator which includes an isolation slot which extends through the substrate between the first and second slot antennas,
wherein the isolation slot is a substrate isolation slot.

17. The portable electronic device assembly of claim 16, further comprising:
a C-cover for a laptop which includes the substrate, and
a D-cover for the laptop which includes the opposite substrate; or
an A-cover for a tablet which includes the substrate, and
a display frame for a tablet which includes the opposite substrate.

18. The portable electronic device assembly of claim 16, further comprising:
an opposite antenna slot in the opposite substrate having an opposite slot long axis parallel to the first slot long axis,
wherein the opposite antenna slot is opposite the first slot; and
a second opposite antenna slot in the opposite substrate having a second opposite slot long axis parallel to the second slot long axis,
wherein the second opposite slot is opposite the second slot.

19. The portable electronic device assembly of claim 18, wherein:

the opposite antenna slot is connected to the first slot by a first slot portion which extends along an edge portion, and the second opposite antenna slot is connected to the second slot by a second slot portion which extends along the edge portion.

20. A portable electronic device assembly, comprising:

a cover which includes a substrate, a first slot, and a second slot; and a slot assembly for a portable electronic device, including:

a first slot antenna including the first slot through the substrate from an outer surface of the substrate to an inner surface of the substrate, a second slot antenna including the second slot through the substrate from the outer surface of the substrate to the inner surface of the substrate, and an isolator which includes a conductor which connects the inner surface of the substrate between the first and second antennas to an opposite inner surface of an opposite substrate opposite the inner surface between the first and second antennas.

21. The portable electronic device assembly of claim 20, further comprising:

a C-cover for a laptop which includes the substrate, and a D-cover for the laptop which includes the opposite substrate; or an A-cover for a tablet which includes the substrate, and a display frame for a tablet which includes the opposite substrate.

22. The portable electronic device assembly of claim 20, further comprising:

an opposite antenna slot in the opposite substrate having an opposite slot long axis parallel to the first slot long axis, wherein the opposite antenna slot is opposite the first slot; and a second opposite antenna slot in the opposite substrate having a second opposite slot long axis parallel to the second slot long axis, wherein the second opposite slot is opposite the second slot.

23. The portable electronic device assembly of claim 20, wherein:

the opposite antenna slot is connected to the first slot by a first slot portion which extends along an edge portion, and the second opposite antenna slot is connected to the second slot by a second slot portion which extends along the edge portion.

24. The portable electronic device assembly of claim 20, wherein the isolator further includes an isolation slot including a substrate isolation slot which extends through the substrate between the first and second slot antennas.

* * * * *